June 4, 1963 L. G. SIMJIAN 3,092,433
DEPOSITORY MACHINE COMBINED WITH IMAGE RECORDING MEANS
Filed July 22, 1960 7 Sheets-Sheet 1

*INVENTOR.*
LUTHER G. SIMJIAN
BY
AGENT

FIG. 2

INVENTOR.
LUTHER G. SIMJIAN

BY Ervin B. Steinberg
AGENT 3,092,433
DEPOSITORY MACHINE COMBINED WITH IMAGE RECORDING MEANS
Luther G. Simjian, Greenwich, Conn., assignor to Universal Match Corporation, Ferguson, Mo., a corporation of Delaware
Filed July 22, 1960, Ser. No. 44,778
14 Claims. (Cl. 346—22)

This invention generally relates to automatic machines for depositing articles of value and more particularly has reference to a machine which is adapted to accept a bank type deposit in the form of checks, currency and the like whereby the deposit is accompanied by a deposit tag which identifies the depositor and/or itemizes the items forming the deposit. In a further sense, the instant invention is related also to machines of the type described in U.S. Patent No. 2,936,684 entitled "Depository Machine Combined with Camera Means," issued May 17, 1960, and in U.S. Patent No. 2,909,107, entitled, "Vending Machine Combined with Camera Means," issued October 20, 1959.

More specifically, the invention refers to a simplified depository machine which is adapted to accept any number of deposit items, provides a documentary record of each of the deposited items, and returns to the depositor a validated deposit tag which originally accompanied the items forming the deposit. In order to provide this simplification, the instant apparatus is equipped with two aperture means, one aperture means for receiving one or more deposit tags and the other aperture means for receiving the remaining items forming the deposit, particularly checks, paper currency and the like. The deposit tag or tags initially supplied by the depositor become validated by validating means disposed in the machine and subsequently image recording means provided within the apparatus produce a documentary record of the validated deposit tag or tags. The other items of the deposit, that is checks and currency, also are recorded by the image recording means whereby the image of each item is disposed in associated identifiable relationship with an image of the validated deposit tag or tags. Finally, a validated and recorded deposit tag is returned to the depositor to serve as a receipt for the deposit.

An important feature of the present arrangement comprises the provision of sensing means for sensing the presence of the required quantity of deposit tags, and control means which disable the document feeding means in the absence of the deposit tag or tags. In this manner, operation of the machine is prevented in the absence of the deposit or depositor identifying tag or tags. A further salient feature of the invention includes the arrangement of an upper and lower aperture, the upper aperture adapted to feed checks, currency and the like which form the deposit, and the lower aperture cooperating with article carrying means for receiving from the depositor the deposit tag or tags. The carrying means serve to move the deposit tag or tags into the machine and to return one of the deposit tags to the depositor when the documents forming the deposit have been properly recorded and are no longer accessible to the depositor.

One of the objects of this invention therefore, is the provision of an improved depository apparatus provided with image recording means which is suitable for accepting bank type deposits.

Another object of this invention is the provision of an improved depository machine which receives any quantity of items for deposit and receives also an identifying deposit tag, provides documentary proof of each accepted article and finally returns to the depositor a duly validated and recorded deposit tag.

A further object of this invention is the provision of a depository machine which is equipped with a pair of apertures, one aperture for deposit tag or tags and the other aperture for documents, particularly checks, currency and the like.

A still further object of this invention is the provision of a depository machine combined with image recording means which provides documentary proof of deposited documents by sequentially recording an image of each of the accepted documents and wherein the beginning and end of a deposit is visible by recorded images of an associated deposit tag.

Further and still other objects of this invention will be apparent by reference to the following description taken in conjunction with the accompanying drawings in which.

Figure 1:
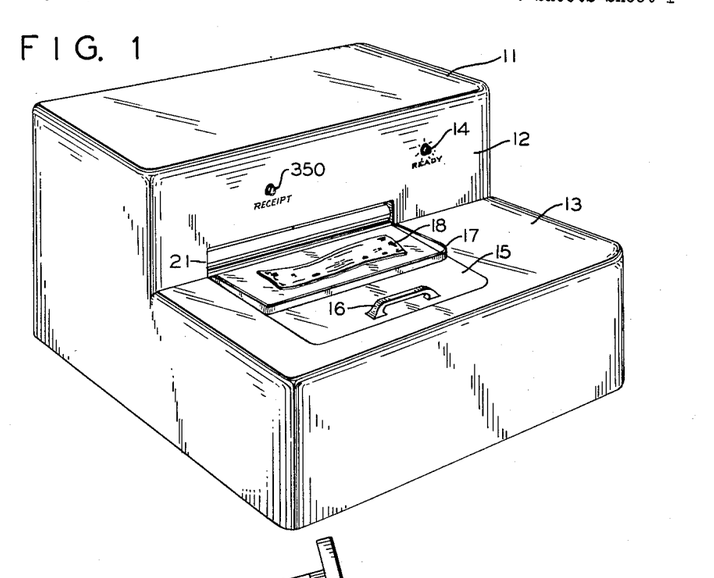
FIGURE 1 is a perspective view of the depository machine's exterior.

Referring now to the figures and FIGURE 1 in particular, a depositor using the depository machine views an enclosure 11 which is provided with a vertical panel 12 and a horizontal panel 13. Along the vertical panel 12 there is mounted a pushbutton switch 350 and a "Ready" light 14. Light 14 is energized when the machine is ready to accept a deposit. Pushbutton switch 350 is actuated by the depositor when all documents have been fed into the machine and a receipt is desired to issue from the machine.

The horizontal panel is equipped with an access cover 15 which is provided with a handle 16 and a tray 17. This tray serves to receive from a depositor one or more documents, such as a check or currency 18, which are to be fed manually into the machine. The tray is provided primarily for the convenience of the depositor.

Above the tray there is located an elongated slit type aperture 21 by means of which documents forming the deposit, particularly checks, paper currency and the like, are fed into the machine for deposit therein. Power driven rollers disposed behind the aperture control whether documents can be fed through this aperture or whether the aperture is essentially locked when the rollers are standing still. Access cover 15 is hinged along the bottom edge of the vertical panel 12 and when raised, exposes an article carrying means in the form of a movable tray, the latter being adapted to accept one or more deposit or depositor identifying deposit tags. These deposit tags are prepared by the depositor in the customary manner and normally list the depositor's name, if desired the depositor's account number, and moreover, tabulate in itemized form all of the documents which form the deposit.

It will be understood, therefore, that when effecting a deposit, one or more deposit tags are placed on the article carrying means disposed underneath cover 15 and that the other documents forming the deposit, that is, checks, currency and the like, are fed into the machine via aperture 21. These latter documents are fed sequentially through aperture 21 by removing one document after another from tray 17 and feeding it through the rollers. It will be apparent that automatic feeding means may readily be substituted without deviating from the principle of the invention.

Figure 2:
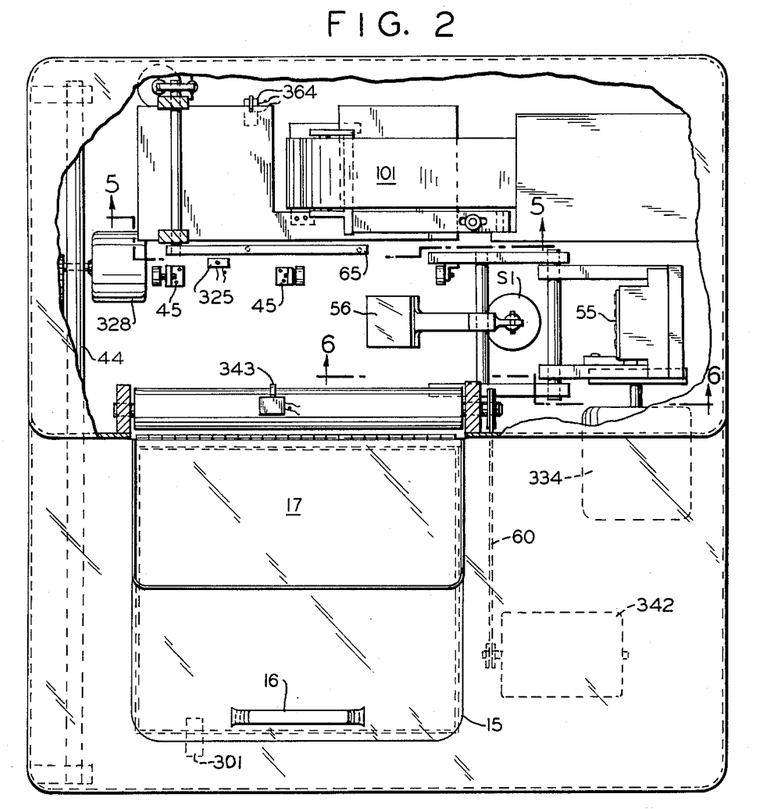
FIGURE 2 is a plan view of the machine with the enclosure partly broken away.
Figure 3:
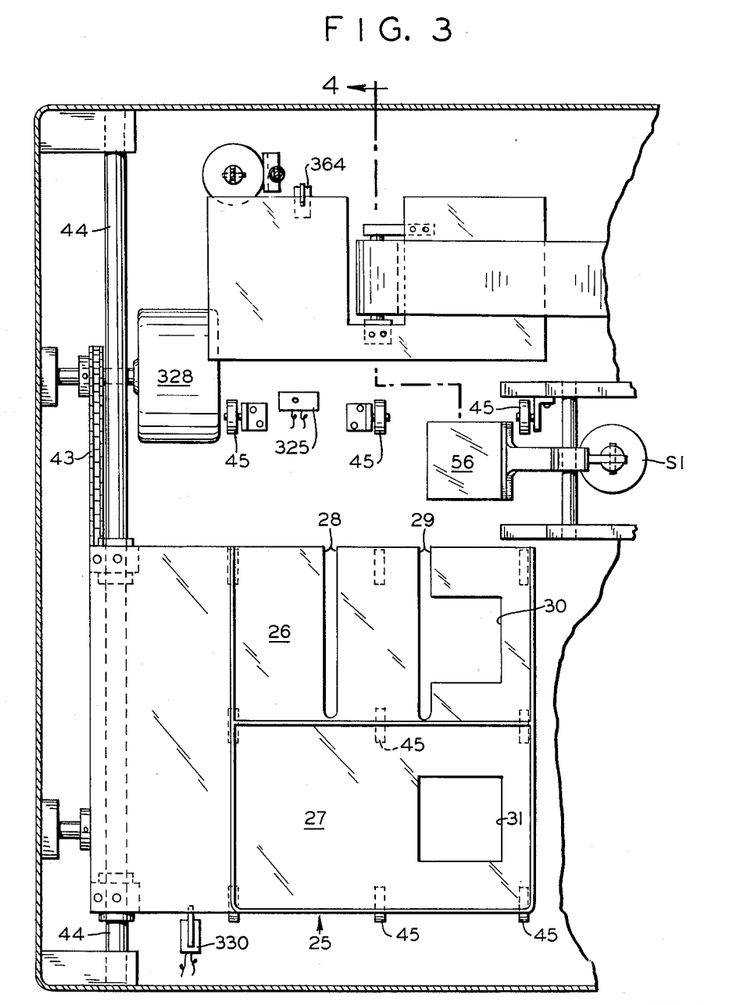
FIGURE 3 is a view taken along lines 3—3 in FIGURE 4.
Figure 4:
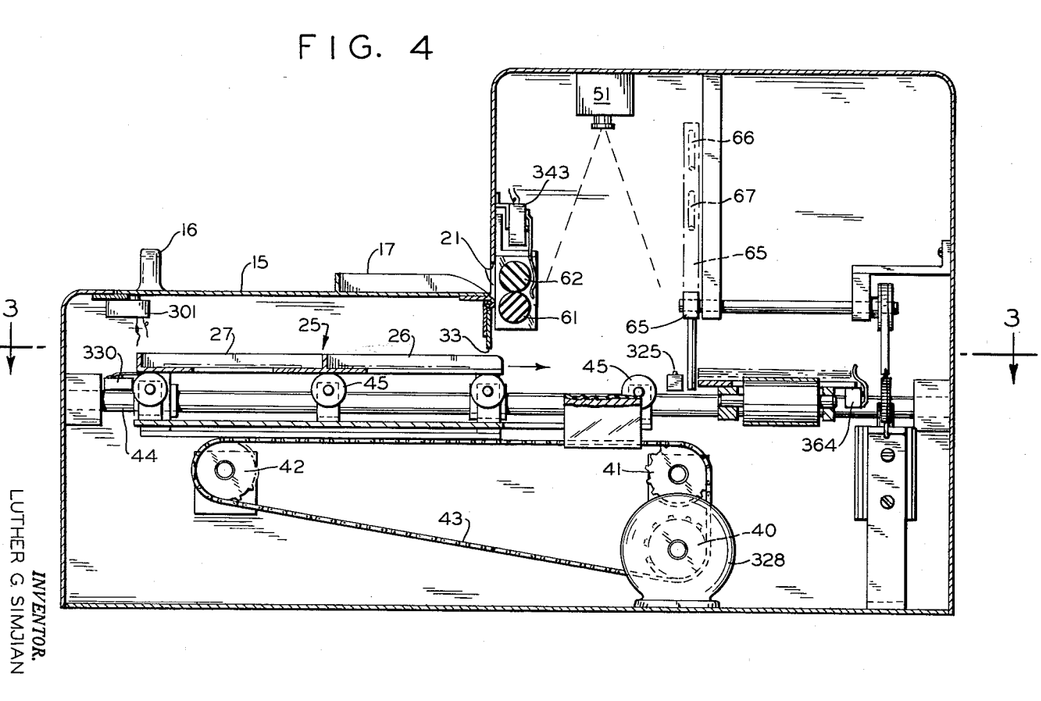
FIGURE 4 is a cross-sectional view along lines 4—4 in FIGURE 3.

Referring now to FIGURES 2, 3, and 4, the tray type article carrying means 25 concealed by closed cover 15 is equipped with a forward compartment 26 and a rearward compartment 27. These compartments are constructed in the form of an open tray in order to enable the placing thereupon of the depositor prepared deposit tags when access cover 15 is raised. In the preferred embodiment one deposit tag is placed on each tray. The forward compartment 26 is provided with a set of longitudinal slots 28 and 29 and a substantially rectangular cutout 30, while the rear compartment omits the slots but is equipped with a similar cutout 31, the significance of the slots and cutout will be explained later.

The article carrying means 25 is mounted for reciprocatory motion relative to aperture 33 in order to carry the deposit tags placed upon the tray into the machine and also for returning to the depositor one of the validated deposit tags which will serve as a receipt for the deposit. Motion of the carrying means into the machine is accomplished by a drive motor 328, sprockets 40, 41 and 42, and a sprocket chain 43 suitably attached to the carrying means. Additionally, there is provided for guiding and supporting the article carrying means a longitudinal guide shaft 44 and a plurality of support rollers 45. It will be understood by those skilled in the art that the underside of the article carrying means is equipped with suitable sliding bearings and that the support rollers 45 are mounted for rotation and at a height to adequately support the article carrying means.

Figure 7:
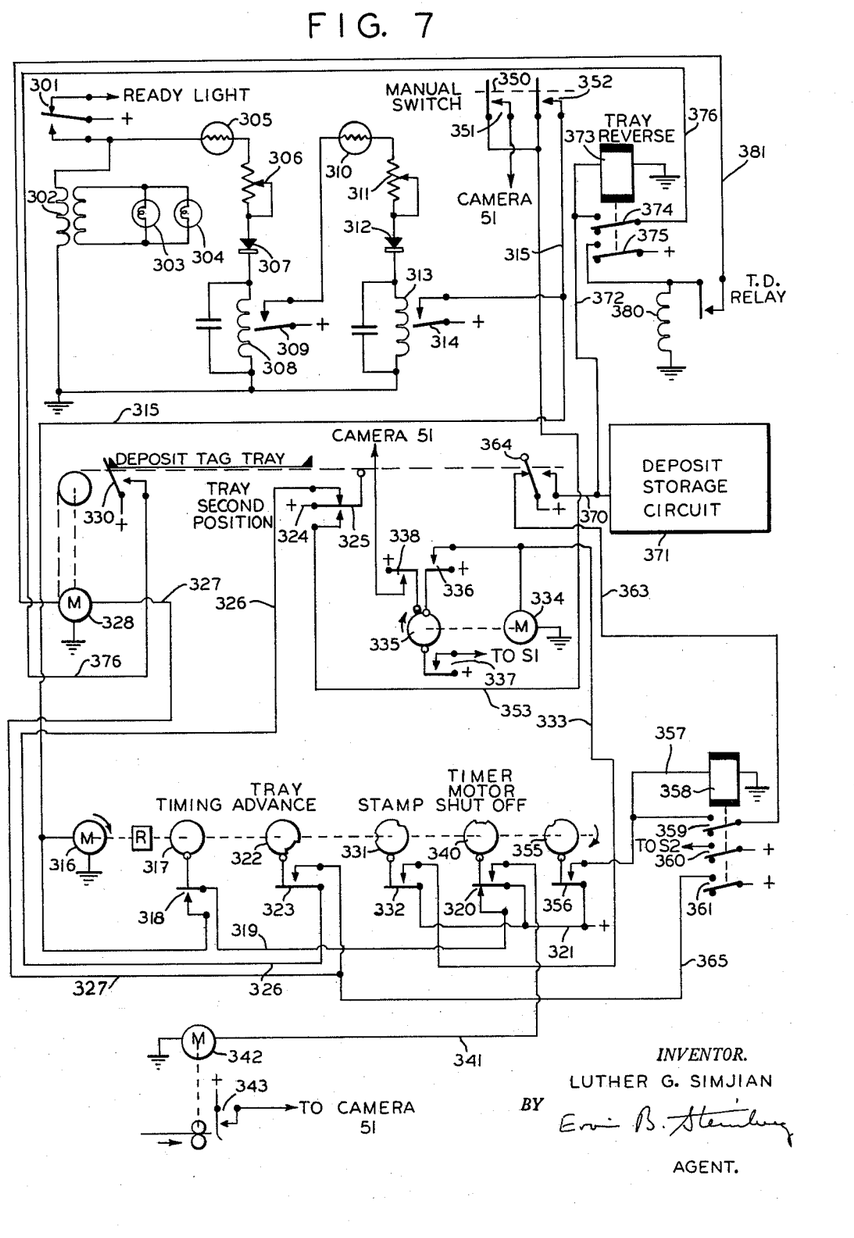
FIGURE 7 is a schematical electrical circuit diagram showing the electrical connections for operating the instant machine.

As shown in FIGURES 2, 3, and 4, the article carrying means 25 is disposed at what may be termed "first position," that is, compartments 26 and 27 are located underneath access cover 15 and may be loaded by a depositor with the respective deposit tags. When compartment 26 has been loaded with a first deposit tag and compartment 27 with a second deposit tag which preferably is a duplicate copy, and access cover 15 is closed as sensed by switch 301, the machine is ready to start along its cycle of operation. In order to ascertain that a set of deposit tags has actually been placed into the respective compartments of the tray, sensing means such as photoelectric sensing means, shown only in FIGURE 7, are provided which cooperate with light emitting means in such a way that each deposit tag reflects light from the light emitting means toward the photoelectric sensing means. Only when the photoelectric means are energized, denoting the presence of the respective deposit tags, can the machine be started. In an alternative manner, sensing switches, electrical contacts or similar means may be used to determine the presence of the deposit tags.

As the machine is started, the article carrying means leaves its first position, operating sensing switch 330, and moves toward the right, FIGURE 4, until forward compartment 26 comes to rest underneath the image recording means 51 which is mounted to the inside top of the enclosure 11. The arrival of the tray at the second position of the article carrying means is sensed by the leading edge of the article carrying means actuating switch 325. When in this position, the first deposit tag disposed in compartment 26 is plainly in view of image recording means 51. The image recording means in its preferred embodiment comprises an electrically actuated microfilm camera such as is well known in the art. In an alternative manner other image recording means may be substituted for providing documentary proof of documents fed into the machine.

At this second position of the article carrying means there is provided a validating means for imprinting the deposit tag with validating data such as a serial number, date, bank number, bank seal or such other indicia or validation markings as may be desired. The means causing validation comprise primarily a motor 334, FIGURE 6, which drives a wheel 52, a push rod 53 fastened with one end near the periphery of the wheel and a bracket 54 secured to the other end of the rod. As motor 334 rotates and drives wheel 52 through one revolution, bracket 54 is pivoted to cause the embossed printing head 55 to assume its lowered position as shown by the dotted line in FIGURE 6. When the printing head 55 is lowered upon the deposit tag disposed in compartment 26, solenoid S1 momentarily is energized to raise printing platen 56 to cause the platen to occupy its horizontal position as indicated by the dashed lines in FIGURE 6, thereby imprinting the first deposit tag disposed in the forward compartment of the article carrying means 25 with validating data. Cutout 30 in compartment 27 enables the cooperation of printing head 55 with platen 56.

Figure 6:
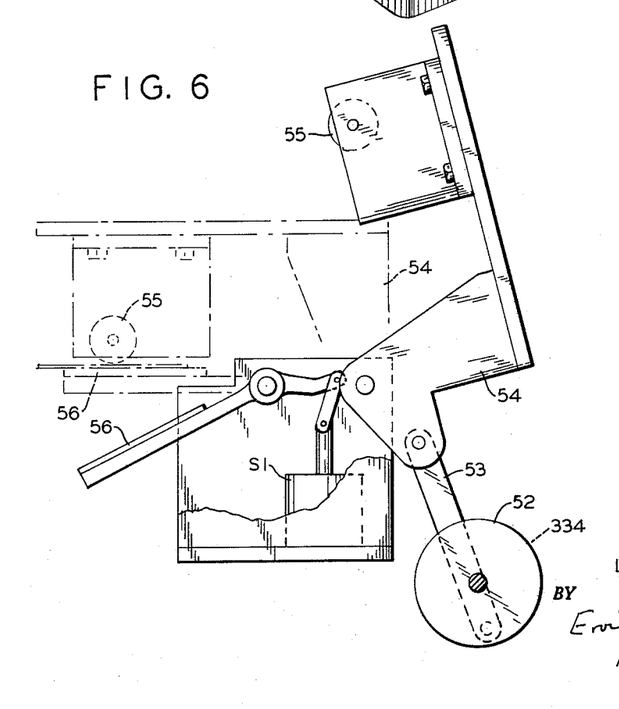
FIGURE 6 is a view along lines 6—6 in FIGURE 2.

When the deposit tag has properly been validated, the printing head is restored to its vertical position in order not to obstruct the view of the image recording means. Subsequently, image recording means 51 is triggered to provide a first documentary record of the deposit which in this instance is the validated deposit tag. The imprinting means indicated in FIGURE 6 is made from standard parts and comprises essentially assemblies as found in a validating machine manufactured by the Ajax Business Machines Company, Westbury, Long Island, New York.

Subsequent to validating and recording the first deposit tag, motor 342, FIGURE 2, is energized to drive via belt means 60 the set of document feed rollers 61 and 62 which are mounted to the rear of upper aperture 21. Until the validating and recording of the first deposit tag has been accomplished, the rollers are in locked position and no document can be fed therethrough into the machine. When rollers 61 and 62 are rotating, documents which form the deposit are fed by the depositor sequentially into the machine via aperture 21. As each document passes through the rollers, sensing switch 343, FIGURE 4, is actuated which in turn causes actuation of camera 51. After passing through the rollers the document and all succeeding ones come to rest superposed with respect to one another on the previously validated and recorded deposit tag disposed in compartment 26. Since no particular document guide means are provided, each new document comes to rest on the previously fed one in a random manner. As image recording means 51 is actuated, a photograph is taken of the face of the topmost document in compartment 26 with one or more preceding documents forming the background.

Figure 5:
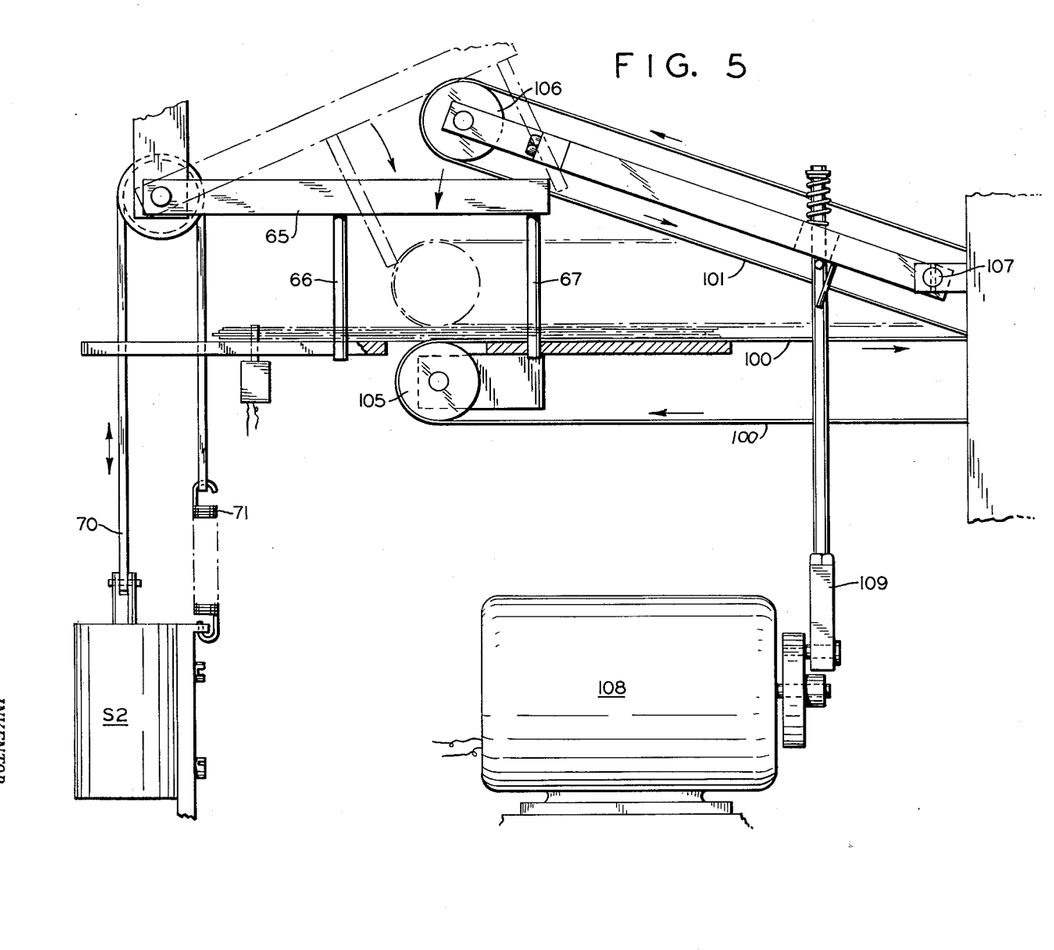
FIGURE 5 is a view along lines 5—5 in FIGURE 2.

When the article carrying means is located at its second position, near the forward edge of compartment 26 there is disposed a gate which comprises a pivotally mounted bar 65 which is provided with two downwardly extending pins 66 and 67, FIGURES 4 and 5. The bar normally is in the lowered position as shown by the solid lines in FIGURES 4 and 5 so that the pins serve as a stop for the documents fed through rollers 61 and 62 and the documents are prevented from falling beyond the leading edge of compartment 26. Pins 66 and 67 therefore, are disposed at the forward end of slots 28 and 29 at this particular moment.

When all documents such as checks and paper currency have been fed through the upper aperture 21 and rollers 61 and 62, pushbutton 350 on the front panel is depressed in order to signify that a receipt from the machine is desired. Depressing of this pushbutton in turn causes control means to energize solenoid S2, FIGURE 5, which acts on belt 70 to overcome the force exerted by spring 71 thereby elevating bar 65 and associated pins 66 and 67 to their raised position as shown by the dashed lines in FIGURES 4 and 5. In this manner, the gate now is open. Shortly thereafter drive motor 328 is re-energized to advance the article carrying means 25 to what is termed the "third position" which is the location when compartment 27 containing the second deposit tag is disposed underneath and in view of image recording means 51. It will be observed that at this moment compartment 26 is disposed to the rear of the gate, toward the right as shown in FIGURE 4. The arrival of compartment 27 underneath image recording means 51 is sensed by the leading edge of tray 25 actuating switch 364. The second deposit tag disposed in compartment 27 is now ready for validation and image recording as has been described in connection with the first deposit tag when the article carrying means was disposed in its second position. Motor 342 which drives document feed rollers 61 and 62 is shut down so that no further documents may be fed into the machine. Also, as the article carrying means reaches the third position, solenoid S2 is de-energized thereby causing pins 66 and 67 to fall into respective slots 28 and 29, the pins occupying a position near the dividing line which separates compartment 26 from compartment 27. Subsequently, drive motor 328 is re-energized to rotate in the reverse direction thereby returning the article carrying means from the third position through the second position to the first position while carrying the validated and recorded second deposit tag in compartment 27. Upon lifting access cover 15 which had been locked previously by means not shown but well known in the art, a depositor now can gain access to the deposit tag which is validated and has been recorded. This duplicate tag serves as a receipt for the deposit comprising the first deposit tag and the documents fed at aperture 21.

The gate, that is, bar 65 and pins 66 and 67 were in their normal position as the tray returned from the third position to the first position, and thus the first deposit tag and superposed documents could not pass through the gate but were retained toward the rear thereof in superposed or stacked relation as seen in FIGURE 4. This deposit retained in the machine and rendered inaccessible to the depositor is now ready for packaging and storage. A convenient way of packaging comprises the wrapping of the stacked deposit between two strips of paper or plastic ribbon and then moving the deposit from the wrapping station. This arrangement is shown more clearly in FIGURES 3 and 5 and comprises a bottom tape 100 and a top tape 101. The bottom tape is fed about a roller 105 and the top tape is fed about a roller 106 in the directions as shown by the respective arrows. Roller 106 is fastened to an arm which is mounted for pivotal motion about a pivot 107 and is raised or lowered about this pivotal point by means of motor 108 and eccentric drive 109. As the tray reaches its third position, roller 106 is in its raised position as shown by the solid lines in FIGURE 5. As the article carrying means returns from its third position to the first position, pins 66 and 67 retain the deposit while the article carrying means moves toward the first position. In this manner as the article carrying means slides from underneath, the first deposit tag and the deposit come to rest on the upper portion of tape 100. A brief moment thereafter, motor 108 is energized and is stopped again in such a way that roller 106 presses against roller 105 thereby confining a portion of the deposit between the tapes. Upon advancing the tapes, the stacked deposit is completely retained between the tapes and moved from this article insertion station. This particular method of wrapping and compartmentizing of articles has been described in detail in my copending application for U.S. Letters Patent, Serial No. 782,177, entitled: "Method and Apparatus for Compartmentizing and Storing an Article," filed December 22, 1958, now U.S. Patent No. 2,971,303, issued February 14, 1961. It will be apparent to those skilled in the art the other compartmentizing and/or deposit storage means may be substituted without deviating from the invention described heretofore.

Although the foregoing description has described the coaction of the various mechanisms in conjunction with the operating procedure, it may be desirable to briefly recapitulate the operation of the machine.

A depositor desirous of effecting a deposit raises access cover 15 unless this cover had been left in the raised position from the previous operation. A first and a second deposit tag filled out by the depositor in the conventional manner are placed on the article carrying means 25, the first deposit tag being placed in the forward compartment 26 and the second deposit tag which ultimately will serve as the receipt, being placed in compartment 27. The compartments are so designed and marked that the deposit tags are disposed with their long edge parallel to the longer side of the respective compartment. Upon insertion of the deposit tags access cover 15 is closed. The presence of the deposit tags is sensed by sensing means and upon determining that the deposit tags are properly supplied and located, the access cover becomes locked and the machine starts to operate. First, the article carrying means is advanced from its first position to a second position where the deposit tag in compartment 26 is in view of image recording means 51. When the article carrying means occupies this second position, its advance is temporarily stopped. The deposit tag in compartment 26 is validated and recorded by the validation means and recording means respectively, both being located at this position. Subsequently, document feed rollers 61 and 62 coacting with aperture 21, the second aperture, are rotated to permit feeding of checks and currency through aperture 21 into the machine. Each of the articles fed through aperture 21 comes to rest in superposed relation on the first deposit tag and on successively fed documents, all being supplied to compartment 26. Documents fed at aperture 21 are recorded by the image recording means 51 in the sequence fed through rollers 61 and 62. When the last document has been fed at aperture 21, control means cause the article carrying means to further advance through aperture 33 thus causing the article carrying means to assume the third position where the deposit tag in compartment 27 is in view of recording means 51. The second deposit tag now is validated and subsequently photographed as described heretofore. Preferably, the validating means are so adjusted that a change in serial number occurs only after every second imprinting operation so that the two deposit tags belonging to one deposit show substantially identical indicia.

After the second deposit tag has been validated and recorded, the article carrying means returns via aperture 33 to the first position where the second deposit tag still retained in compartment 27 is rendered available to the depositor to serve as a receipt. Cover 15 is unlocked and the depositor may remove the deposit tag. Meanwhile, as the article carrying means left its third position, the first deposit tag and documents forming the deposit were removed from compartment 26 and retained in the machine so as to be inaccessible to the depositor. The deposit thus retained is wrapped and stored in order to be distinguishable from a new and succeeding deposit.

Upon analyzing the documentary record provided by image recording means 51 it will be seen that each individual deposit starts with a frame showing the first deposit tag subsequent to its validation, successive frames each showing one of the deposited documents such as checks, currency and the like, and a final frame showing an image of the second deposit tag which after validation and image recording was returned to the depositor to serve as a receipt. In this manner, each deposited document can be clearly identified and associated with a deposit tag which states the depositor, identifies account number or provides other necessary data.

*Description of Circuit, FIGURE 7*

"Ready" light 14 on the front panel normally is energized from switch 301 when the machine is ready to accept a deposit and the access cover 15 is in its raised position. Upon lowering the access cover, switch 301 is actuated so that its movable contact is in the downward position, thereby applying electrical energy to transformer 302 and causing power to be applied to illuminating means 303 and 304. Simultaneously, power is applied via photoconductive tube 305, resistor 306, rectifier 307 to relay 308. When a deposit tag is provided, the tag reflects light and light incident upon photoconductive tube 305 energizes the coil of relay 308. Associated contact 309 which is closed by relay 308 applies energy to photoelectric tube 310 which in turn receives reflected light from one of the illuminating means via the second deposit tag. In series with the photocell 310, there is a resistor 311, rectifier 312 and the coil of an electromagnetic relay 313 which when energized closes the associated contact on switch 314.

Closing of switch 314 applies electric energy via conductor 315 to timing motor 316 which now starts to run and remains running for one cycle by means of cam 317 coupled to the motor and the connection through closed switch 318, conductor 319, switch 320 and energy from conductor 321. As timing motor 316 rotates, cam 322 driven by the motor advances, thus causing the associated roller to fall into the cam recess, thereby closing switch 323. With this movable switch contact in the raised position, energy is applied from conductor 324 via switch 325, conductor 326, switch 323 to conductor 327 and to the chain drive motor 328, thereby advancing the article carrying means (tray) from the first to the second position. As the tray leaves the first position, the movable contact associated with switch 330 moves toward the right.

As the tray advances and reaches the second position, switch 324 is actuated thereby interrupting the energy to conductor 326 and thus stopping motor 328. The tray is now stopped at the second position. A brief moment thereafter, cam 331 has rotated so that switch 332 is closed and applies energy from conductor 321 via switch 332 and conductor 333 to motor 334, thus lowering the imprinting head against the first deposit tag. This motor runs through one cycle by means of timing cam 335 and switch 336. Switch 337 when actuated by the detent in cam 335 energizes solenoid S1 to momentarily raise the printing platen against the imprinting head, thereby validating the first deposit tag. Just before cam 335 completes one revolution switch 338 is actuated momentarily to trigger the microfilm camera 51 for producing a documentary record of the validated first deposit tag.

When the detent in cam 340, driven by motor 316, permits the movable switch 320 to assume its raised position, electric energy in conductor 319 is interrupted and timing motor 316 is stopped temporarily in its cycle of operation. Simultaneously, energy is applied from conductor 321 via switch 320 and conductor 341 to the feed roller motor 342 to rotate these rollers for the purpose of enabling feeding of documents. Every time a document is fed between the rollers, sensing switch 343 is actuated which in turn triggers the camera. It will be noted that when the first document is fed, a second exposure is taken of the first deposit tag resting in compartment 26. If this duplicate documentary record is to be suppressed, simple circuit means may be provided to eliminate this second exposure of the first deposit tag.

As documents are successively fed between the rollers, switch 343 is actuated whereby actuation of the switch causes a record to be taken of the document disposed in the position above the first deposit tag.

Finally, when all documents have been fed through the feed rollers, the depositor actuates switch 350 on the front panel, thereby causing operation of the camera via contact 351 to provide a record of the topmost and final document resting on top of the first deposit tag and in compartment 26 respectively. Operation of switch 350 also closes contact 352 which now applies energy from conductor 324 via switch 325, conductor 353, contact 352 and conductor 315 to timing motor 316 to cause this motor to re-start and advance cams 317, 322, 331, 340, and 355. As cam 340 advances, the movable contact of switch 320 is restored to its lower position, thus interrupting the flow of energy to feed roller motor 342.

In due course, cam 355 assumes a position where energy flows from conductor 321 via switch 356, conductor 357 to the coil of electromagnetic relay 358, thereby closing switch contacts 359, 360 and 361. Closing of switch 359 locks relay 358 via conductor 363 and switch 364 until the article carrying means reaches its third position. Energizing of relay 358 also applies energy via switch 360 to solenoid S2 to raise the gate comprising bar 65 and pins 66 and 67.

Moreover, closing of switch contact 361 applies energy via conductor 365 to the chain drive motor 328, thereby advancing the tray. When the tray arrives at its third position, switch 364 is actuated to interrupt power to conductor 363, thus de-energizing relay 358 and de-energizing also gate solenoid S2 and stopping motor 328 by opening switch 361. Timing motor 316 is still running and as the second detent in cam 331 actuates switch 332, power is applied via conductor 333 to motor 334 to rotate cam 335. As cam 335 rotates, motor 334 remains energized and solenoid S1 becomes energized in due course by switch 337. Before cam 335 assumes its original position, switch 338 again triggers the camera to provide a documentary record of the second deposit tag, resting in compartment 27, subsequent to its validation. When switch 364 became actuated by the deposit tray assuming its third position, switch 364 applied energy via conductor 370 to the deposit storage device 371 to cause the first deposit tag and the documents forming the deposit to be confined between the tapes and moved from the article insertion station. Also, via conductor 372, relay 373 became energized, thereby closing associated contacts 374 and 375. Contact 374 causes relay coil 373 to remain locked by virtue of the connection which includes conductor 376 and switch 330, the switch arm being toward the right since the tray is in the third position.

Closing of contact 375 applies energy to time delay relay 380 which after a delay of several seconds, closes the associated contact thereby sending energy via conductor 381 to chain motor 328 to start the motor in reverse direction and causing the article carrying means to be returned to the first position. As this means is restored to its first position, switch 330 assumes its original position and removes power from relay 373. Timing motor 316 is shut down by cam 317 when its cycle of rotation is completed.

Although the aforesaid description describes the preferred embodiment of the invention, several modifications and changes will be apparent without deviating from the inventive concept disclosed.

When there is no need for a duplicate deposit tag, the machine may readily be modified so that only a single deposit tag is used which is inserted into the rear compartment 27 of the article carrying means 25. In this way the depositor receives a validated and recorded deposit tag which serves as a receipt while the bank or receiving institution of the deposit can inspect the records produced by image recording means 51 for crediting the proper account with the amount of the deposit. The account can readily be identified by inspection of the image of the deposit tag which in this instance forms the last frame on the film. The circuit modification necessary to accomplish this change in the machine comprises merely the disabling of the validating means when the article carrying means 25 is disposed in its second position.

A further modification of the machine comprises the addition of receiving means for coin money. In this modification, coin money may be deposited directly in a separate compartment and if desired, may include coin totalizing means. In an alternative arrangement, coin slots may be provided together with coin totalizing and indicating means. A coin display means showing indicia corresponding to the totalized amount of coins deposited preferably is disposed in view of the image recording means 51 in order that an image of the display means be recorded to establish proof as to the total value of the coins deposited. The combination of coin slots, associated totalizing means and a numerical display is a commercially available unit, being used for instance in the "Mailomat" postage machine manufactured by Pitney-Bowes, Inc., of Stamford, Connecticut, which machine is installed in many lobbies of United States Post Offices.

A still further modification described and illustrated herein concerns the addition of a security arrangement wherein the film cassette usually associated with the microfilm camera and the storage container holding the received deposits can be removed from the machine only upon the attendant having complied with certain procedures. To this end, the film cassette and the deposit receptacle are secured to the machine structure by means of locking solenoids which must be actuated before removal of the cassette and of the receptacle is possible. Moreover, when the cassette and receptacle are to be removed, a record is produced by the machine as will be apparent by reference to FIGURE 8.

Figure 8:
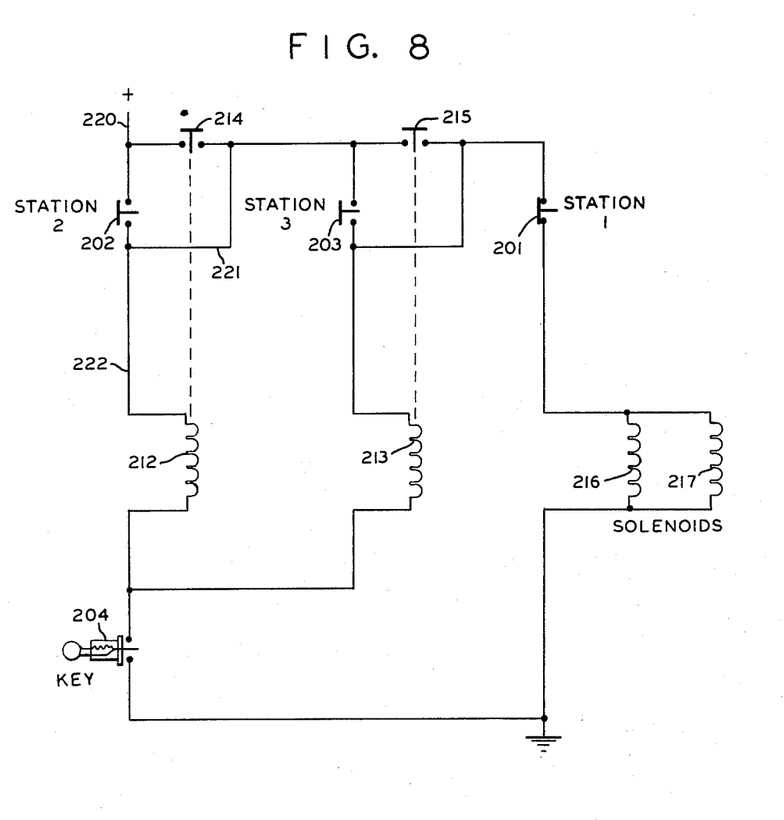
FIGURE 8 is a schematic electrical circuit diagram illustrating a locking arrangement for parts of the machine.

When the attendant wishes to remove the cassette and/or the receptacle, he is required to insert a previously issued pass key into a lock 204 which is associated with an electrical switch. Insertion of the key and operating of the lock closes the associated switch contacts. The article carrying means 25 also is at its first station as sensed by switch 201 which is closed at this moment. Solenoids 216 and 217, one being associated with the cassette and the other one with the receptacle, receive no power since switch contacts 214 and 215 are open.

Next, the attendant places either a pass, a deposit tag or tags, or other prescribed document or documents into respective compartments 26 and 27. This action will start the machine and move the article carrying means 25 to its second position. It will be remembered that the machine will not start in the absence of a document in the compartments. The arrival of the article carrying means 25 at this second position is sensed by switch 202 which becomes closed and applies power from conductor 220 via switch 202 and conductor 222 to electro-magnetic relay coil 212 which is serially connected with key switch 204. Holding contact 214 is closed by virtue of energized coil 212. Switch 201 now is open since the article carrying means is no longer at its first position. At this second position, the first tag or document is validated and photographically recorded as has been described previously. Validation preferably includes affixing of a time stamp.

Upon depressing push button 350, the article carrying means advances to the third position. As the carrying means leaves the second station, relay coil 212 remains energized via closed contact 214 although switch 202 opens upon the article carrying means leaving the second position. When the carrying means arrives at its third position, switch 203 closes and energizes relay coil 213. Also holding contact 215 is closed when coil 213 becomes energized. The second tag now is validated and recorded as has been described hereinbefore.

Briefly, thereafter, the carrying means returns to its first position, leaving relay coils 212 and 213 energized and contacts 214 and 215 closed. As the article carrying means returns, the tag in the forward compartment is stored by the wrapping means in the deposit receptacle as a record, while the other tag, validated and recorded, will serve as a record for the attendant. When the article carrying means arrives at the first station, switch 201 becomes closed, thus energizing solenoids 216 and 217 which receive electrical energy from conductor 220 via closed contacts 215 and 214. The cassette and deposit storage receptacle now may be removed from the machine with documentary proof in hands of the attendant as well as in the deposit storage receptacle. Any time that the key is removed from lock 204, the above described circuit is reset and power is removed from solenoids 216 and 217, thus securing the cassette and receptacle.

As described heretofore, instead of two tags a single pass means or documentary record may suffice for operation of the machine, but as noted, the machine will have to complete a complete cycle of operation so as to produce suitable documentary evidence before the deposits can be removed for accounting or auditing purposes. If desired, insertion of the pass key into lock 204 may trigger the camera which constantly may view a date and time display, thus producing a further record of the time when the attendant first inserted the pass key.

It will be apparent to those skilled in the art that switches 201, 202 and 203 may either comprise independent sensing switches at the respective positions and actuated by the article carrying means, or that these switches may constitute additional contacts on respective switches 330, 325 and 364 in FIGURE 7.

Another modification comprises the addition of a document counter which is placed in view of image recording means 51. This counter when connected for actuation by switch 343 (FIGURE 7) will show the quantity of documents fed through rollers 61 and 62. The image recording means, therefore, will provide documentary evidence of the quantity of documents fed at any instant or the position which one document occupies in the respective deposit. Zeroizing of the counter can be accomplished by a further contact on pushbutton switch 350 since at the time of actuating this switch no further document is fed through aperture 21. For print-out of the data from this counter a separate printing means may be provided or an additional printing head incorporated in the validating means. The data on this head will be synchronized with the pulses from switch 343. When validating the final deposit tag, the tag then will be imprinted with indicia corresponding to the quantity of items which form the deposit.

When there is no desire or need to provide a documentary record of the deposit tag or tags, switch 338 associated with cam 335 may be omitted. Alternatively, a switch may be placed in the conductor from switch 338 to camera 51, thus providing a means for selectively disabling the operation of the camera when feeding the deposit tag or tags.

A very similar solution is achieved by arranging the location for the deposit tags on the article carrying means 25 in such a manner that the deposit tag or tags are not in view of the image recording means when the article carrying means is moved to its advanced positions. In order to provide, however, suitable cross reference between the validated tag or tags and the documentary record, i.e. film, a digital display device is permanently provided in view of the image recording means 51. This display device then is operatively connected to the validation means so as to be synchronized therewith. Thus, the serializing number affixed to the deposit tag during validation will be identical or related to the display and recorded by means 51. In this latter arrangement, the validated tag or tags carry identifying indicia provided by the validation means, which indicia are referenced on the recording medium, i.e. microfilm, by means of an additional indicia display means.

While there has been described a preferred embodiment of the instant invention and several modifications, it will be apparent to those skilled in the art that various further and other changes and modifications may be made therein without departing from the principle and intent of the present invention which shall be limited only by the scope of the appended claims.

What is claimed is:

1. A machine of the type described which includes:
first aperture means for receiving from a depositor an identifying deposit tag;
second aperture means for receiving documents such as checks, currency and the like which form the deposit;

means transferring a deposit tag received at said first aperture means into said machine;

validating means disposed in said machine for validating the deposit tag subsequent to its receipt in said machine;

image recording means for viewing the validated tag and for providing a documentary record thereof;

means causing documents fed at said second aperture means to come sequentially in view of said image recording means;

sensing and control means coupled to said validating means and said image recording means for sensing the transfer of a deposit tag into said machine and in response thereto actuating said validating means to validate the tag, and subsequently actuating said image recording means to record in sequence an image of the tag and each document fed into said machine;

means for returning the validated and recorded deposit tag to the depositor;

means for retaining the recorded documents as a deposit inaccessible to the depositor;

said sensing and control means also coupled to said returning means and said retaining means and actuating the same subsequent to the operation of said validating means and said image recording means.

2. In a machine of the type described which includes:

first aperture means for receiving from a depositor a plurality of identifying deposit tags;

second aperture means for receiving documents such as checks, currency and the like, which form the deposit;

means transferring the deposit tags received at said first aperture means into said machine;

validating means disposed in said machine for validating each of the plurality of tags subsequent to their receipt in said machine;

image recording means for viewing the validated tags and for providing a documentary record thereof;

means causing documents fed at said second aperture means to come sequentially in view of said image recording means;

sensing and control means coupled to said validating means and said image recording means for sensing the transfer of the deposit tags into said machine and in response thereto actuating said validating means to validate the tags, and subsequently actuating said image recording means to record in sequence an image of the tags and each document fed into said machine;

means for returning one of the validated and recorded deposit tags to the depositor;

means for retaining another of the validated and recorded deposit tags and the recorded documents as a deposit inaccessible to the depositor;

said sensing and control means also coupled to said returning means and said retaining means and actuating the same subsequent to the operation of said validating means and said image recording means.

3. A machine of the type described which includes:

first aperture means for receiving from a depositor an identifying deposit tag;

second aperture means for receiving documents such as checks, currency and the like which form the deposit;

means transferring a deposit tag received at said first aperture means into said machine;

validating means disposed in said machine for validating the deposit tag subsequent to its receipt in said machine;

image recording means for viewing the validated tag and for providing a documentary record thereof;

means causing documents fed at said second aperture means to come sequentially in view of said image recording means;

sensing and control means coupled to said validating means and said image recording means for sensing the transfer of a deposit tag into said machine and in response thereto actuating said validating means to validate the tag and subsequently actuating said image recording means to record in sequence an image of the tag and each document fed into said machine;

means for returning the validated and recorded deposit tag to the depositor via said first aperture means;

means for retaining the recorded documents as a deposit inaccessible to the depositor;

said sensing and control means also coupled to said returning means and said retaining means and including means to provide a signal indicating that the last document of the deposit has been fed into said machine, and in response to said signal actuating said returning means and said retaining means.

4. In a machine of the type described which includes:

first aperture means for receiving from a depositor a plurality of identifying deposit tags;

second aperture means for receiving documents such as checks, currency and the like;

means transferring the deposit tags received at said first aperture means into said machine;

validating means disposed in said machine for validating each of the plurality of tags subsequent to their receipt in said machine;

image recording means for viewing the validated tags and for providing a documentary record thereof;

means causing documents fed at said second aperture means to come sequentially in view of said image recording means;

sensing and control means coupled to said validating means and said image recording means for sensing the transfer of a deposit tag into said machine and in response thereto actuating said validating means to validate the tags, and subsequently actuating said image recording means to record in sequence an image of the tags and each document fed into said machine;

means for returning one of the validated and recorded deposit tags to the depositor via said first aperture means;

means for retaining another of the validated and recorded deposit tags and the recorded documents as a deposit inaccessible to the depositor;

said sensing and control means also coupled to said returning means and said retaining means and including means to provide a signal indicating that the last document of the deposit has been fed into said machine, and in response to said signal actuating said retaining means and said returning means.

5. A machine of the type described which includes image recording means, the combination of: a first and a second aperture means; article carrying means coacting with the first aperture means for receiving from a depositor a first and a second identifying deposit tag; sensing means adapted to sense the presence of the first and second deposit tags on the carrying means and causing the machine to be inoperative in the absence of the deposit tags on said carrying means; a second aperture means adapted to receive sequentially documents such as checks, currency and the like which form the deposit; said carrying means adapted to transfer the deposit tags via said first aperture means into the machine; validating means disposed in the machine to validate each of said plurality of deposit tags subsequent to their receipt in the machine; said image recording means adapted to view said validated tags and being actuated to provide a documentary record thereof subsequent to their validation; means causing said documents fed at said second aperture means to come sequentially in view of the image recording means; means causing successive operation of the image recording means in response to the feeding of said documents whereby said recording means produce a record of each of said documents; means removing one of said validated and recorded tags from said carrying means and retaining said tag together with said recorded documents inacessible to the depositor, and means returning the other validated and recorded deposit tag by means of said carrying means and first aperture means to said depositor whereby said returned, validated and recorded deposit tag serves as a receipt for the documents.

6. A machine of the type described which includes image recording means, the combination of: a first and a second aperture means; article carrying means coacting with the first aperture means for receiving from a depositor a first and a second identifying deposit tag; sensing means adapted to sense the presence of the first and second deposit tags on the carrying means; article feed means coacting with said second aperture means to feed sequentially documents such as checks, currency and the like into the machine; image recording means disposed to view said sequentially fed documents; means connected to said recording means for causing operation thereof in response to the receipt of a document at said second aperture means whereby to record an image of each document; and control means cooperating with said sensing means to prevent operation of said feed means in the absence of the first and second deposit tags on the carrying means.

7. A machine of the type described which includes image recording means, the combination of: a first and a second aperture means; article carrying means coacting with the first aperture means for receiving from a depositor a first and a second deposit tag; the second aperture means adapted to receive sequentially documents such as checks, currency and the like which form the deposit; said article carrying means adapted to occupy respectively, a first, second and third position relative to the aperture means; said carrying means when disposed at said first position capable of being loaded with said first and second deposit tags; means guiding said article carrying means to the second position whereby the first deposit tag is in position for validation and image recording; validating means disposed for affixing validation marks to said first deposit tag when said carrying means is at said second position; said image recording means disposed to view said first deposit tag at said second position and said recording means being actuated to record an image of said first deposit tag subsequent to its validation; means enabling domuments to be fed through the second aperture means whereby sequentially said documents come to rest in superposed position on said validated and recorded first deposit tag; means sequentially actuating the recording means to provide a documentary record of each of the documents as each document comes to rest on said first deposit tag; control means subsequently causing said carrying means to advance to the third position whereby the second deposit tag comes to rest in position for validation and image recording; control means causing sequentially operation of the validation means and of the image recording means to respectively validate the second tag and record an image thereof; means removing said recorded first deposit tag and documents from said carrying means and rendering said tag and documents inaccessible to the depositor, and control means causing said article carrying means to be returned to the first position whereby said second deposit tag duly validated and recorded is rendered accessible to the depositor to serve as a receipt for the deposit.

8. A machine of the type described which includes image recording means, the combination of: a front panel; an upper and a lower aperture disposed on said panel; article carrying means coacting with the lower aperture for receiving from a depositor a first and a second deposit tag; the upper aperture adapted to receive sequentially documents such as checks, currency and the like which form the deposit; said article carrying means mounted for moving through the lower aperture and adapted to occupy sequentially, a first, second and third position relative to the front panel and lower aperture; said carrying means when disposed at said first position capable of being loaded by a depositor with said first and second deposit tags; means guiding said article carrying means through the lower aperture to the second position whereby the first deposit tag is in position for validation and image recording; validating means disposed for affixing validation marks to said first deposit tag when said carrying means is at said second position; said image recording means disposed to view said first deposit tag at said second position and said recording means being actuated to record an image of said first deposit tag subsequent to its validation; means enabling documents to be fed through the upper aperture whereby sequentially said documents come to rest in superposed position on said validated and recorded first deposit tag; means sequentially actuating the recording means to provide a documentary record of each of the documents as each document comes to rest stacked on said first deposit tag; control means subsequently causing said carrying means to advance to the third position whereby the second deposit tag comes to rest in position for validation and image recording; control means causing sequentially operation of the validation means and of the image recording means to validate the second deposit tag and record an image thereof; means removing said first recorded deposit tag and documents from said carrying means and rendering said tag and documents inaccessible to the depositor, and control means causing said article carrying means to be returned to its first position whereby said second deposit tag duly validated and recorded is rendered accessible to the depositor to serve as a receipt for the deposit.

9. A machine of the type described which includes:
   first aperture and feeding means for receiving from a depositor an identifying deposit tag and feeding the tag into said machine for validation and image recording;
   second aperture and feeding means, for receiving from the depositor documents such as checks, currency and the like which form the deposit and feeding the documents into said machine, having a normal condition of preventing the feeding of documents into said machine and an actuated condition of feeding documents into said machine;
   validating means disposed within said machine for affixing validation means to a deposit tag within said machine;
   image recording means disposed for viewing and recording a deposit tag within said machine;
   control means coupled to said first aperture and feeding means, said second aperture and feeding means, said validating means and said image recording means and responsive to the feeding of a tag within said machine to actuate said validating means to validate the tag, to actuate said image recording means to record an image of the tag subsequent to the validation thereof, and to actuate said second aperture and feeding means to feed documents into said machine subsequent to the validation of the tag.

10. A machine of the type described which includes image recording means, the combination of: a first and a second aperture means; article carrying means coacting with the first aperture means for receiving from a depositor a deposit tag; the second aperture means adapted to receive sequentially documents such as checks, currency and the like which form the deposit; said carrying means adapted to occupy sequentially a first and a second position relative to the first aperture means; said carrying means when disposed at said first position capable of being loaded with a deposit tag; means guiding said article carrying means upon receipt of the deposit tag to the second position whereby the deposit tag is in position for validation and image recording; validating means disposed for affixing validation marks to said deposit tag when said carrying means is at said second position; said image recording means disposed to view said deposit tag at said second position; means actuating said recording means for recording an image of said deposit tag subsequent to its validation; means enabling documents to be fed through the second aperture means whereby sequentially said documents come to rest in superposed position on said validated and recorded deposit tag; means sequentially actuating the recording means to provide a documentary record of the face of each of the documents as each document comes to rest randomly oriented on said deposit tag, and said image recording means thus providing an individual record of the face of each deposited document with the previously fed document partially hidden and serving as background.

11. A machine of the type described which includes image recording means, a removable cassette containing recorded images and a removable receptacle containing deposits, the combination of: locking means securing said cassette and storage receptacle to the machine; aperture means on said machine adapted to receive a document; said image recording means disposed to view said document subsequent to its insertion into the machine at said aperture means; means actuating said recording means to provide a documentary record of said document, and control means responsive to the operation of said image recording means connected to said locking means thereby rendering said cassette and receptacle removable from said machine only after said documentary record has been produced by said image recording means.

12. A machine of the type described which includes image recording means, a removable cassette containing recorded images and a removable receptacle containing deposits, the combination of: locking means securing said cassette and storage receptacle to the machine; aperture means on said machine adapted to receive a document; said image recording means disposed to view said document subsequent to its insertion into the machine at said aperture means; validating means disposed in the machine and adapted to engage said document; means actuating said validating means subsequent to the receipt of the document in the machine and causing validation of the document; means actuating said recording means to provide a documentary record of the validated document, and control means responsive to the operation of said validating and recording means connected to said locking means thereby rendering said cassette and receptacle removable from the machine only after said document has been validated and recorded.

13. A machine of the type described which includes image recording means, the combination of; a first and a second aperture means; article carrying means coacting with the first aperture means for receiving from a depositor a deposit tag; sensing means adapted to sense the presence of the tag on the carrying means; article feed means; the second aperture means coacting with said article feed means to feed sequentially documents such as checks, currency and the like received at the second aperture means into the machine; image recording means disposed to view said sequentially fed document; means connected to said recording means for causing operation thereof in response to the operation of the feed means whereby to record an image of each document fed into the machine; and control means cooperating with said sensing means to prevent operation of said feed means in the absence of the deposit tag on the carrying means.

14. In a machine of the type described, the combination of an enclosure;

first document receiving means including first guide means for receiving documents from a depositor into said enclosure and guiding the documents along a first path to a destination within said enclosure;

second independent document receiving means including second guide means for receiving documents from the depositor into said enclosure and guiding these latter documents along a second path to said destination within said enclosure;

validating means disposed within said enclosure along said first path for validating documents received by first receiving means;

image recording means disposed for recording images of documents guided by said first guiding means and documents guided by said second guiding means; and control means, including sensing means, coupled to said first receiving means, said second receiving means, said validating means, and said recording means; said control means responsive to the sensing by said sensing means of the receipt of a document by said first receiving means for actuating said validating means to validate the document received by said first receiving means, and responsive to the sensing by said sensing means of a document received by said first receiving means for actuating said recording means for recording an image of the document received by said first receiving means, and responsive to the sensing by said sensing means of a document received by said second receiving means for actuating said recording means for recording an image of the document received by said second receiving means.

References Cited in the file of this patent

UNITED STATES PATENTS

| | | |
|---|---|---|
| 2,923,587 | Zipf | Feb. 2, 1960 |
| 2,936,684 | Simjian | May 17, 1960 |

FOREIGN PATENTS

| | | |
|---|---|---|
| 605,678 | Germany | Feb. 4, 1933 |